(12) United States Patent
Rajpathak

(10) Patent No.: US 8,489,601 B2
(45) Date of Patent: Jul. 16, 2013

(54) KNOWLEDGE EXTRACTION METHODOLOGY FOR UNSTRUCTURED DATA USING ONTOLOGY-BASED TEXT MINING

(75) Inventor: Dnyanesh Rajpathak, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 12/832,142

(22) Filed: Jul. 8, 2010

(65) Prior Publication Data

US 2012/0011073 A1 Jan. 12, 2012

(51) Int. Cl.
*G06F 17/30* (2006.01)
(52) U.S. Cl.
USPC .......................................... 707/736; 707/802
(58) Field of Classification Search
USPC .................................. 707/736, 802
See application file for complete search history.

(56) References Cited

U.S. PATENT DOCUMENTS

| | | | | |
|---|---|---|---|---|
| 6,415,395 | B1 * | 7/2002 | Varma et al. ..................... | 714/37 |
| 2007/0061487 | A1 * | 3/2007 | Moore et al. ................... | 709/246 |
| 2007/0083300 | A1 * | 4/2007 | Mukheriee ........................ | 701/3 |
| 2008/0189253 | A1 * | 8/2008 | Oliver et al. ..................... | 707/3 |
| 2008/0228769 | A1 * | 9/2008 | Lita et al. ........................ | 707/6 |
| 2011/0035094 | A1 * | 2/2011 | Van Den Berg et al. ........ | 701/33 |
| 2011/0119231 | A1 * | 5/2011 | Namburu et al. ............. | 707/609 |
| 2011/0208742 | A1 * | 8/2011 | Chakrabarty et al. ........ | 707/740 |

OTHER PUBLICATIONS

Zoubida Kedad, Elisabeth Metals: Ontology-Based Data Cleaning, 2002 in: Natural Language Processing and Information Systems, LNCS vol. 2553, 137-149, DOI: 10.1007/3-540-36271-1_12.
Development and Research of Automotive Engine Fault Diagnosis Expert System, published Feb. 2005, Chinese Journal of Coal Mine Machinery, vol. 2, 2005, Xin Hui-Juan, Dai Quing-Hui.

* cited by examiner

*Primary Examiner* — Son T Hoang

(57) ABSTRACT

A method for extracting data from service repair verbatims in a vehicle service reporting system. Each service repair verbatim includes a technician's comments concerning a part, a symptom associated with the part, and a repair action associated with the symptom. Each service repair verbatim includes information relating to an identified problem with at least one vehicle part. A diagnostic and prognostic ontology database is provided that is structured by vehicle part classification, a vehicle part sub-class classification, and a relationship classification, wherein the relationship classification includes symptom relationships and action relationships. Each of the service repair verbatims are reconstructed utilizing the diagnostic and prognostic ontology database. Combinations of information are extracted from the reconstructed service repair verbatims as a function of user input criteria. A frequency is determined of each combination extracted in the reconstructed service repair verbatims. The service repair verbatims are clustered for each combination.

22 Claims, 3 Drawing Sheets

KNOWLEDGE EXTRACTION METHODOLOGY FOR UNSTRUCTURED DATA USING ONTOLOGY-BASED TEXT MINING

BACKGROUND OF INVENTION

An embodiment relates generally to data mining of warranty service repair data.

Typical text mining tools generate searches utilizing simple search criteria such as single term searches. Many current text mining tools cannot handle poorly written sentences or unstructured service repair data consisting of different types of noises, such as abbreviated service repair information, incomplete service repair text, and misspellings. Furthermore the existing tools cannot identify the anomaly cases from the field data such as comparing a respective labor code description (which consists of 'name of a part to be fixed' and a 'repair action to be taken' for fixing the fault associated with a part) with a respective reported labor code for identifying mismatches. Therefore, for a search that requires more than a single term, there is no guarantee that the combination of searched terms in the service repair verbatim has a precise relationship between one another. Moreover, unless the exact terms searched appears in each of the different sets of documents, clustering of service repair technician verbatim (i.e. documents) to identify frequently failing parts in addition to the symptoms associated with these parts and the repair actions that are taken by the technicians to fix the fault may be incomplete. This would results in unobservable data representation for the subject matter expertise mining the data and attempting to take appropriate decision making action.

SUMMARY OF INVENTION

An advantage of an embodiment is the generation of usable data that enables a user to analyze warranty data by clustering related service repair documents together. The text mining tool extracts domain specific information in different combinations along with the relationships that exist between extracted concepts. The extracted information is then used to generate three different combinations of hierarchical cluster of documents in such a manner that the most frequent types of repair actions that are used to fix the faults are highlighted. The names of three cluster combinations are—Cluster 1 which is the Part cluster; Cluster 2 which is the Part-Symptom cluster; and Cluster 3 which is the Part-Symptom-Action cluster. These different cluster combinations help the subject matter expertise to visualize data from different perspective.

An embodiment contemplates a method of extracting data from service repair verbatims in a vehicle service reporting system. Each service repair verbatim includes a technician's comments concerning a part, a symptom associated with the part, and a repair action associated with the symptom. Service repair verbatims are collected from a vehicle service reporting system. Each service repair verbatim includes information relating to an identified problem with at least one vehicle part. A diagnostic and prognostic ontology database is provided that is structured by vehicle part classification, a vehicle part sub-class classification, and a relationship classification, wherein the relationship classification includes symptom relationships and action relationships. Each of the service repair verbatims are reconstructed utilizing the diagnostic and prognostic ontology database. Combinations of information are extracted from the reconstructed service repair verbatims as a function of user input criteria. A frequency is determined of each combination extracted in the reconstructed service repair verbatims. The service repair verbatims are clustered for each combination.

DETAILED DESCRIPTION

Figure 1:
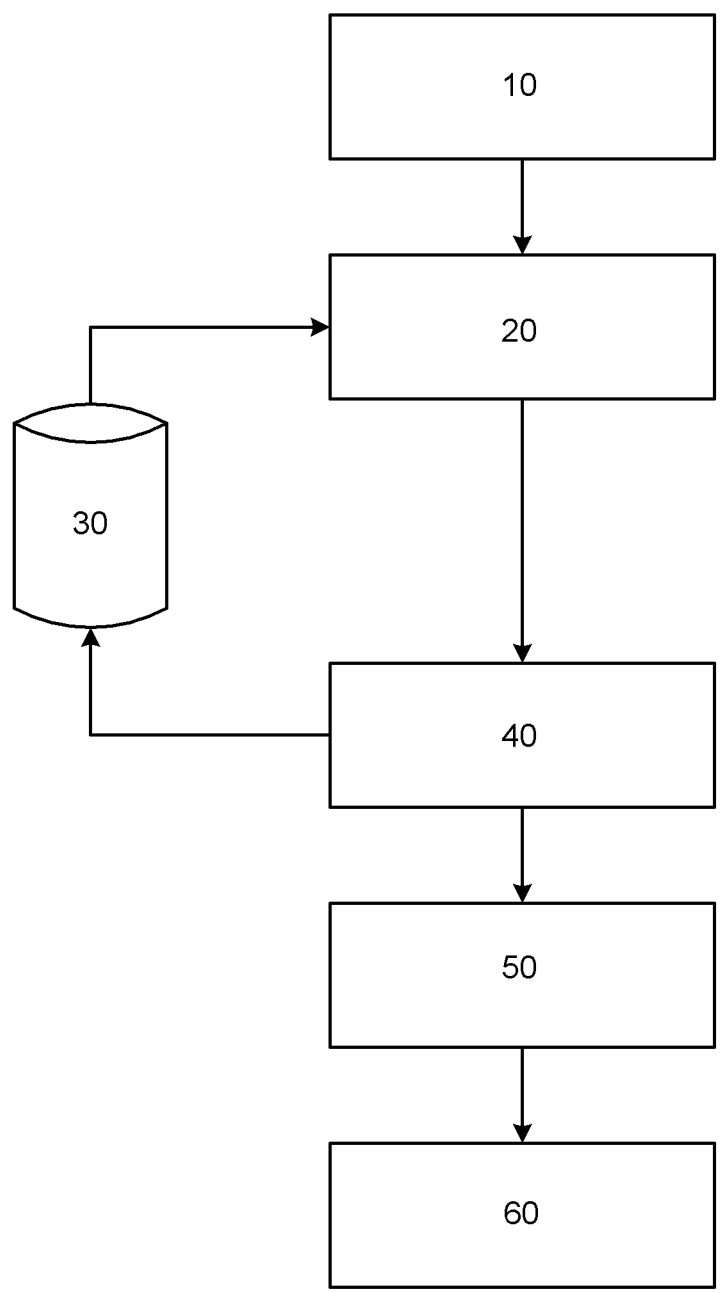
FIG. 1 is a block diagram of a text mining system of the invention.

There is shown in FIG. 1 a flow diagram of a framework for text mining part terms, symptom terms, and action terms either individually or in combination, from service repair verbatims stored in a warranty database of a warranty database reporting system.

The warranty database includes a memory storage unit that stores information relating a concern and a repair of the vehicle. The warranty database preferably is a central database that receives and compiles service repair verbatims from all service facilities of a respective manufacturer such as vehicle manufacturer. Typically, vehicle service facilities determine the cause of a problem and submit a predetermined labor code to the warranty database. The labor code includes a predefined description of the repair made to the vehicle and the part that is repaired. The system also allows the service technician to enter details of the service inspection, the diagnosis, and the service repair. The part causing the issue, the description of the issue, and the actual repair may be referred to as the part, symptom, and action, respectively. In many instances, the details of a service repair verbatim input by the service technician do not necessarily match what the labor code description represents. For example, a part-symptom verbatim may indicate a repair action 'battery-repaired' as the {Part Action} combination. However, the labor code reported indicates that the "battery is replaced", but the description reported by the service technician states that the battery was recharged. As a result, there are anomalies in the data in which the reported labor codes do not correlate with inputs by the service technician. Moreover, there may be trends as to how a number of dealerships or one particular dealership is submitting warranty claims. Therefore, it is crucial in a warranty reporting system to accurately describe and report what is the faulty part, what is the issue, and what is the correct repair action. Having the correct descriptions of each field allows subject matter experts who review the warranty data to readily assess such problems and take appropriate counteractions to correct the issue accordingly.

In FIG. 1, specifically at block 10, a document corpus is generated from the database. The document corpus includes the entire listings of service repair verbatims supplied to the warranty reporting database from all vehicle service facilities. The service repair verbatims are typically unstructured text meaning that there may be run-on sentences with no definitive delimiters (e.g. distinguishing punctuation marks) separating the sentences. Moreover, delimiters may be incorrectly utilized in the unstructured text making it difficult to ascertain what constitutes a complete sentence in the service repair verbatim. Furthermore, the service repair verbatims consist of different types of noises, such as abbreviated service repair information, incomplete service repair text, and misspellings.

In block 20, unstructured text is reconstructed with the assistance of domain specific knowledge database in the form of diagnostic and prognostic (D&P) ontology 30. The D&P ontology 30 is stored, exchanged, and machine readable so that it can be shared and re-used in different automotive application domains. In a broad structure, the D&P ontology has a structure of the form $\{C, C_{subclass}, Rel_{Ci>1}\}$ where C represents a category of top level concepts such as parts (e.g., door, control module). Each "part" concept in the D&P ontology consists of a base word, which represents the most appropriate domain specific reference to that respective part concept. The base word is more or less a root of the word for which different forms of the base word appear in a service repair verbatim. For example, the part concept "electronic brake control module" may be written as "brake control module" or "EBCM". The base word provides a subject matter expert or similar, who analyzes the data, to disambiguate between different ways in which the part is recorded in the service repair verbatim.

To better distinguish the categories based on the further specificity in which the class concepts are organized, a subclass hierarchy is represented by $C_{subclass}$. Lastly, a relation that exists between two or more classes in D&P domain is represented by $Rel_{Ci>1}$ as it is necessary to establish the relationship between the class (part) and the class (action) that is performed on the respective part. In a nutshell, the D&P Ontology provides a systematic framework to formalize the domain specific knowledge by defining the classes, the relationships between them, and the subclasses such that this standardized knowledge can be reused in different diagnostic applications of automotive. For example, key concepts that are included in the D&P ontology are Part, Action, Symptom, Part Location, and LaborCode. Some of the main relationships in the D&P ontology that are necessary to formalize the domain specific knowledge therein include, but are not limited to, Part Has-A-Location (Part, Part Location), Action Performed-On-Part (Action Part), Symptom Associated-With-Part (Symptom Part), Action Rectifies Symptom (Action Symptom), and Action Has-Labor-Code (Action Labor-Code).

Referring again to block 20, reconstruction is performed on each service repair verbatim within the corpus documents. Reconstruction includes tokenization, stop word deletion, word stemming, and lexical matching. Document reconstruction formats each service repair verbatim into proper sentence structure with readily identifiable words that can be matched with correlating terms within the D&P ontology database.

In block 40, semantic extraction is performed. Semantic extraction includes the process of extracting different combinations of information from each service repair verbatim taken into account user specific requirements. The extracted information is derived from the different combinations comprised of Parts, Symptoms, and Actions. The combinations include {Part Symptom}, {Part Action}, {Symptom Action}, and {Part Symptom Action}. Extracting information in multiple combinations allows end-users to construct different clusters of the service repair verbatims. As a result, overlooking information is greatly reduced by the construction of various clusters of combined data.

In block 50, knowledge discovery in the form of clustering is performed on the extracted information. Clustering involves the collection of the service repair verbatims with the related information grouped together. That is, those reconstructed service repair verbatims that include the extracted semantics as selected by the user are indexed and grouped to form a cluster. There are three types of clusters that can be constructed: the part-based cluster, the part-symptom cluster, and the part-symptom-action cluster.

The part-based clusters are constructed by utilizing the part terms as input features. Each part cluster consists of one or more service repair verbatims that include a record of a user specified part. That is, a respective part cluster will have service repair verbatims relating to the name of an identified part as selected by the user therein.

The part-symptom clusters are constructed by utilizing the part and symptom terms as input features that are frequently co-occurring in the data. Each part-symptom cluster consists of one or more service repair verbatims wherein a specific part coexists with a specific symptom. A respective part-symptom cluster will have service repair verbatims that contains a specific part name and a specific associated symptom. This enables subject matter expertise to realize the most frequent parts that are appearing in a data along with the symptoms. Multiple clusters may be constructed utilizing a specific part and a different symptom. Examples of the multiple clusters using a specific part and different symptoms include, but are not limited to, {Battery-Dead}, {Battery-Inop}, and {Battery-Leak}.

The part-symptom-action clusters are constructed by utilizing part terms, symptom terms, and action terms as input features. Each part-symptom-action cluster consists of one or more service repair verbatims wherein a specific part coexists with a specific symptom and specific action. A respective part-symptom-action cluster will have service repair verbatims that contains a specific part name, a specific symptom associated with the specific part, and a specific action associated with the specific symptom. Examples of multiple clusters using a specific part co-occurring with associated symptoms and associated repair actions within the service repair verbatim include, but are not limited to, {Battery-Dead-Recharge}, {Battery-Dead-Replace}, and {Battery-Dead-Diagnosis}.

In step 60, the results are output for analysis to the user. The user may be a subject matter expert, technician, warranty personnel, engineer, field service personnel, and technical specialist having knowledge of the technologies of the vehicle. The output results may be generated in the form of graphical content, such as paretos, to be used for analysis. The paretos provide a unique way to analyze the service centers involved in the frequently appearing {Part-Symptom-Action} cases that are fixing the problems in a timely and cost efficient manner. At the same time, the pareto analysis is used to identify those respective service centers where the repairs are not fixed in timely and cost efficient manner. Furthermore paretos can be constructed to group {Part-Symptom}, {Symptom-Action} and {Part-Symptom-Action} cases of vehicles in accordance with vehicle build date and vehicle build year. If there are specific vehicle make(s) and model(s) that are frequently appearing in a data which symptoms that are related to mechanical component (e.g. engine), then the manufacturing plants where the respective vehicles are assembled/manufactured can also be plotted in paretos to realize the origin of a problem.

Figure 2:
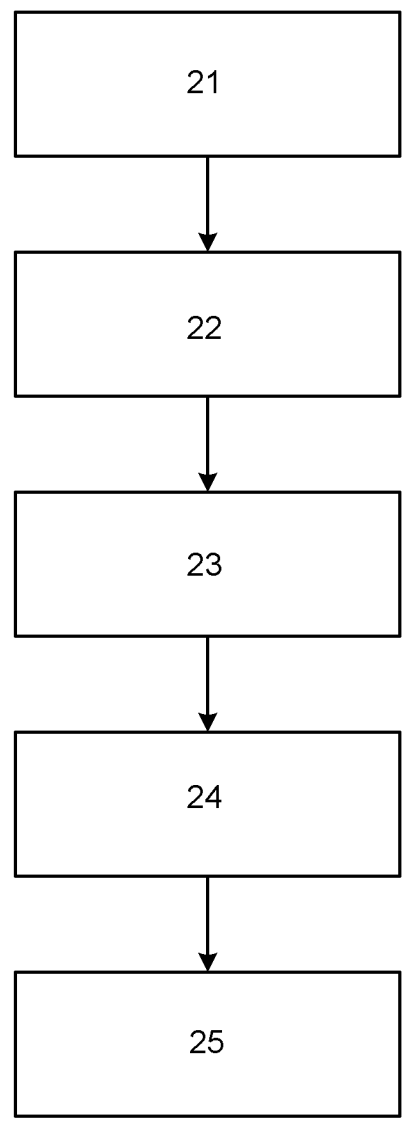
FIG. 2 is a block diagram of an unstructured text reconstruction process of the invention.

FIG. 2 illustrates a block diagram for reconstructing unstructured text in the service repair verbatim. In block 21, text reconstruction is initiated by splitting each service repair verbatim, if required, into different sentences. As described earlier, service repair verbatims are potentially entered as unstructured text where the technician provides details and explanations of the problem encountered, explanation of how the issue was diagnosed, and the recommended repair action. The technician may freely enter the details in a structured or unstructured format. In natural language, processing the sentence boundary determination is a problem in having to decide where the sentence begins and ends. To determine the sentence boundary, the period is used as a sentence delimiter. To determine that the period does in fact represent a sentence boundary, as opposed to punctuation mark such as an abbreviation, various rules are proposed to split the service repair verbatims into a sentence as follows:

Rule 1—If a term token is concatenated with a "period" that is followed by a white space and the first character of a succeeding term after a white space is a capitalized alphabet, e.g. "door. Fixed . . . ", then such the "period" is considered a valid sentence boundary.

Rule 2—If a term token is concatenated with a "period", then it is checked in a standard abbreviation list supplied by the vehicle manufacturer to make sure that it is a valid abbreviation, e.g. "PCM.". If the valid abbreviation is followed by a white space and the first character of a succeeding term is a capitalized character, e.g. 'brkn. Fixed . . . ', then a period is considered as a valid sentence boundary.

Rule 3—If a valid abbreviation is concatenated with a "period" and it is surrounded by the phrases on either side, e.g. "the door is brkn. so it is fixed", then the "period" is not considered a valid sentence boundary.

Rule 4—If a "period" is concatenated with integers on its left and right side without any white spaces in between, e.g. "0.5 olh is claimed", then the "period" is not treated as a valid sentence boundary.

Rule 5a—if a "period" is concatenated with an alphabet that is followed by another alphabet without any white space in between and the second alphabet is concatenated with a period, for example, "e.g.", then the "period" is considered an invalid sentence boundary.

Rule 5b—if a "period" is concatenated with an alphabet that is followed by a second alphabet that is concatenated with a "period" without any white space in between and there are no strings of characters after the second "period", then the second "period" is considers a valid sentence boundary, e.g. "we have to meet at 5 p.m." (end of sentence).

The above mentioned rules may be modified to handle other punctuations that include, but are not limited to, hyphens (-), underscores (_), question marks (?), exclamation marks (!), colons (:), and semi-colons (;).

In block 22, after the service repair verbatim is segregated into respective sentences, a tokenization technique is implemented by removing the white spaces while taking into account the frequent deliminators as described above.

In block 23, after performing the tokenization step, stop words within the service repair verbatim are deleted. Stop words add unnecessary noise in the data while performing natural language processing of the data. Stop words consist of, but are not limited to, "a", "an", "the", "who", "www", "because", and "becomes", which are considered to be non-descriptive. However, it should be understood that stop words which are part of the symptom phrases should not be deleted. Therefore, each recognized symptom phrase is checked against a stop word list. Stop words identified in the stop word list that are part of the symptom phrase are ignored by a stop word deletion algorithm.

In block 24, all the action words/phrases and symptom words/phrases are stemmed. Stemming of a word reduces the inflected words into their base form. However, it is essential to understand that not all stemmed words are identical to the morphological root of the word. An example of stemming includes a service repair verbatim that contains a symptom written in different linguistic forms such as "leaking", leaked, and "leaks". The stemming algorithm reduces all these different forms to their base term "leak".

In block 25, lexical matching technique is applied where the stemmed action and symptom tokens along with the part tokens are matched with the part concepts from the corresponding concepts in the D&P ontology by performing full string matching. In various instances, a same part token is represented as different linguistic variations e.g., "Powertrain Control Module", "PC Module", and "PCM". To disambiguate between the part tokens, the lexical matching technique matches each linguistic variation of the part token with a same base-word associated with the corresponding parts in the D&P ontology. Due to the respective symptom tokens having multiple meanings (e.g., the token TPS may represent either a 'tank pressure sensor' or a 'tire pressure sensor'), the lexical matching technique provides a unique method for identifying the correct interpretation of a symptom. The lexical matching technique takes into account the adjacent words which appear with each meaning of a symptom token.

The lexical matching technique first constructs all possible $\{symptom_i, part_k\}$ and $\{symptom_i, action_j\}$ pairs that appear in a service repair verbatim. A check is then made to determine a frequency of each $\{symptom_i, part_k\}$ and $\{symptom_i, action_j\}$ pair over the entire corpus of service repair verbatim for determining how many times each pair appears in the corpus.

The symptom token, $symptom_i$, which has the highest number of parts and actions that co-occur with the $symptom_i$ are treated as the correct symptom specific content within the service repair verbatim. Furthermore, a unique heuristic rule is implemented to avoid repetitive and time consuming iterations to identify the diagnostic trouble code string of characters that is written in service repair verbatim. For example, a symptom portion database contains over 6000 diagnostic trouble codes (DTCs), and in a worst case scenario, the algorithm would need to perform 6000 iterations to match DTC string used in the service repair verbatim. To avoid the number of iterations to match the DTC string of characters, a heuristic rule such as the exemplary heuristic rule as follows: "if the first character of a token is a character between "a to z" and it is followed by a numeric between "0 to 9", and the length of a token is 5 characters, then the token is reformatted as a DTC" is implemented.

Figure 3:
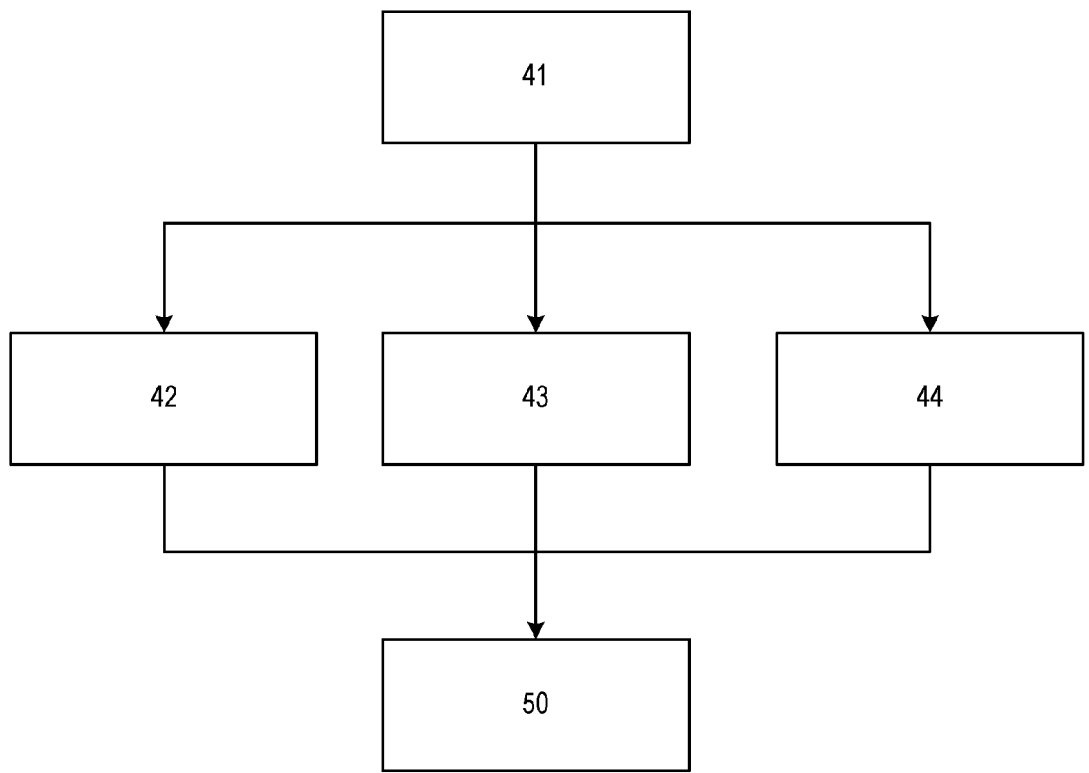
FIG. 3 is a block diagram of semantic extractor of the invention.

FIG. 3 illustrates a block diagram of a semantic extractor. In block 41, the extraction process is initiated by extracting different combinations of part terms, symptom terms, and action terms. The number of different combinations that are selected are dictated by the user's specific requirements. The semantic extractor allows end users to make use of the extracted information to construct the different clusters of service repair verbatims. The semantic extractor allows the user to specify which reconstructed information needs to be extracted. The different combinations may be extracted as triplicate combinations, double combinations, or single terms.

Block 42 represents semantic extraction as a single term. That is, for extraction by terms, terms may be extracted as a part term, an action term, or a symptom term.

Block 43 represents semantic extraction as a paired combination. For an extracted paired combination, the different forms of combinations may include {part, action}, {part, symptom}, and {action, symptom}.

Block 44 represents semantic extraction as a triplicate combination. For an extracted triplicate combination, all three terms are extracted {part, symptom, action}, or combinations thereof such as {symptom, part, action}, {action, symptom, part}.

The extracted terms and/or combinations are then used to form clusters in block 50. It should be understood that the frequency of each of the extracted terms or combinations are collected for identifying the top issues that are frequently cited in the service repair verbatims.

Clustering is utilized to collect the service repair verbatims as a function of the terms and combinations extracted by the semantic extractor. The advantage as described herein is that clustering takes into account frequently co-occurring combinations as described earlier. The following steps are used to cluster service repair verbatims as a function of the extracted terms and combinations.

In step 51, the sentence boundary is determined and the service repair verbatim is split into different sentences. Each split sentence is analyzed to determine if terms and combinations are present.

In step 52, the part-based cluster is constructed. Each part term extracted are compared with each sentence in each service repair verbatim. When a part term is matched, an index of the service repair verbatim is collected and is recorded as part of the cluster. All of the collected indices of the service repair verbatims recorded for the respective part term form a respective cluster. Therefore, each part term forms a respective cluster.

In step 53, the part-symptom cluster is constructed. The identified part term is set as the focal term in each split sentence. A fixed number of words to the left of the focal term and a fixed number of words to the right of the focal term forms a window. The following two steps are used to form the paired clusters.

In step 53a, if a single symptom appears in a window, then the pair of the combination is constructed. The frequency of the paired combination is determined from each of the service repair verbatims to see whether the frequency of the pair combination is higher than a minimum frequency threshold. A paired combination having a frequency higher than the minimum frequency threshold is considered a valid paired combination $\{part_i, symptom_j\}$. The indices of all the service repair verbatims recorded for the respective paired combination form a respective cluster.

In step 53b, if a multiple symptoms appear in a window, then the distances from the part term to each symptom is determined. The symptom closest to the part term is selected to construct the part combination with part term $\{part_i, symptom_j\}$. The frequency of the paired combination is determined from each of the service repair verbatims to see whether the frequency of the paired combination is higher than a minimum frequency threshold. A paired combination having a frequency higher than the minimum frequency threshold is considered a valid paired combination. The indices of all the service repair verbatims recorded for the respective paired combination form a respective cluster.

In step 54, a part-symptom-action cluster is constructed. A focal term (i.e., symptom) is determined in each split sentence. A fixed number of words to the left of the focal term and the fixed number of words to the right of the focal term form a window. The following two steps are used to form the paired clusters.

In step 54a, if a single action appears in a window, then the triple combination is constructed. The frequency of the triple combination is determined from each of the service repair verbatims to see whether the frequency of the pair combination is higher than a minimum frequency threshold. A triplicate combination having a frequency higher than the minimum frequency threshold is considered a valid triplicate combination $\{part_i, symptom_j, action_k\}$. The indices of all the service repair verbatims recorded for the respective triplicate combination form a respective cluster.

In step 54b, if a multiple actions appear in a window, then the distances from the symptom of each action is determined. The action closest to the symptom is selected to construct the triplicate combination with part term and action $\{part_i, symptom_j, action_k\}$. The frequency of the triplicate combination is determined from each of the service repair verbatims to see whether the frequency of the triplicate combination is higher than a minimum frequency threshold. A triplicate combination having a frequency higher than the minimum frequency threshold is considered a valid triplicate combination. The indices of all the service repair verbatims recorded for the respective triplicate combination form a respective cluster.

After the clustering technique is performed, there may be documents (service repair verbatims) residing in two separate clusters that share the same information. That is, due to the similar definitive meaning of certain terms, duplicate sets of service repair verbatims may be present in different clusters. For example, cluster 1 that includes a part-symptom combination cluster contains a service repair verbatim with information {radio, inoperative}. Cluster 2 includes a part-symptom combination cluster contains a service repair verbatim with information {compact disc player, inoperative}. Under such circumstances, cluster 1 and cluster 2 contain essentially the same information concerning the same electronic module. In such a case, these two clusters are merged into a meta cluster (e.g., cluster 3) which now consists of service repair verbatims which are associated with the electronic module so that the subject matter expert or similar receives an aggregate level of insight into the problem associated with the electronic module.

Graphs, such as pareto analysis may be generated for analysis by the subject matter expert or similar. The following are examples of terms or combinations searched that may be output in a graphical content. Graph analysis allows the subject matter to focus on specific combinations of terms while taking into consideration labor codes for determining whether the service repair verbatims are correctly binned. For example, a subject matter expert may be interested in reviewing only the field data concerning the part cluster, which would result in the most frequently re-occurring parts (i.e., causes) from the database are selected. If the subject matter expert is interested in reviewing the frequently associated symptoms (i.e., concerns) that are associated with each cause (i.e., part), then a pareto of the analysis is generated. Then a graph may be generate that displays the paired combination such as {Battery-Dead}, {Battery-Inop}, and {Battery-Leak}. Moreover, the subject matter expert generate graphs where a respective cluster is segregated by the following criteria that includes, but is not limited to, service centers, build dates, vehicle model, and vehicle make.

While certain embodiments of the present invention have been described in detail, those familiar with the art to which this invention relates will recognize various alternative designs and embodiments for practicing the invention as defined by the following claims.

What is claimed is:

1. A method of extracting data from service repair verbatims in a vehicle service reporting system, the method comprising:

collecting the service repair verbatims from the vehicle service reporting system, each service repair verbatim including an identified problem with at least one vehicle part, a technician's comments concerning the at least one vehicle part, a symptom associated with the at least one vehicle part, and a repair action associated with the symptom;

providing a diagnostic and prognostic ontology database that is structured by a vehicle part classification, a vehicle part sub-class classification, and a relationship classification, wherein the relationship classification includes symptom relationships and action relationships;

reconstructing each of the service repair verbatims utilizing the diagnostic and prognostic ontology database and segregating each respective service repair verbatim into one or more sentences;

extracting combinations of information from the reconstructed service repair verbatims as a function of user input criteria by a processor;

determining a frequency of appearance of each combination extracted in the reconstructed service repair verbatims by the processor, and;

clustering the service repair verbatims for each combination based on the frequency of appearance by the processor, wherein the clustering the service repair verbatims includes forming at least one part-symptom-action cluster, wherein a respective part-symptom-action cluster is constructed with service repair verbatims having a respective part name, an associated symptom, and an associated repair action within each service repair verbatim, wherein indices of the service repair verbatims that include the respective part name, the associated symptom, and the associated repair action are grouped to form the respective part-symptom-action cluster;

wherein associating the respective symptom and a respective repair action with a respective part name in a service repair verbatim comprises the following steps:

determining sentence boundaries within the service repair verbatim, the sentence boundaries identifying where the service repair verbatim is segregated into one or more sentences;

identifying the respective part name within one of the sentence boundaries of the service repair verbatim;

setting the respective part name as a focal term within each sentence boundary;

setting a window to include a respective number of terms to the left of the focal term and a respective number of terms to the right of the focal term;

determining whether the respective symptom and the respective repair action appears within the window; and constructing a part-symptom-action relationship in response to the respective symptom and respective repair action appearing within the window.

2. The method of claim 1, wherein the step of constructing the part-symptom-action relationship further comprises the following steps of:

determining if multiple symptoms appear in the window;

determining a distance from each symptom identified in the window to the focal term;

selecting one of the multiple symptoms at a closest distance to the focal term;

determining if multiple repairs actions appear in the window;

setting the selected symptom as a next focal term;

determining a distance from each repair action within the window to the next focal term;

selecting one of the multiple repair actions at a closest distance to the next focal term; and constructing the part-symptom-action relationship utilizing the identified part name, the selected symptom, and the selected action.

3. The method of claim 2, wherein each combined part name, associated symptom, and associated repair action form a respective part-symptom-action cluster.

4. A method of extracting data from service repair verbatims in a vehicle service reporting system, the method comprising:

collecting the service repair verbatims from the vehicle service reporting system, each service repair verbatim including to an identified problem with at least one vehicle part, a technician's comments concerning the at least one vehicle part, a symptom associated with the at least one vehicle part, and a repair action associated with the symptom;

providing a diagnostic and prognostic ontology database that is structured by a vehicle part classification, a vehicle part sub-class classification, and a relationship classification, wherein the relationship classification includes symptom relationships and action relationships;

reconstructing each of the service repair verbatims utilizing the diagnostic and prognostic ontology database;

extracting combinations of information from the reconstructed service repair verbatims as a function of user input criteria by a processor;

determining a frequency of appearance of each combination extracted in the reconstructed service repair verbatims by the processor, and;

clustering the reconstructed service repair verbatims for each combination based on the frequency of appearance by the processor.

5. The method of claim 4, wherein the step of reconstructing each service repair verbatim includes segregating each respective service repair verbatim into one or more sentences.

6. The method of claim 5, wherein the step of reconstructing each service repair verbatim includes identifying part words, symptom words, and repair action words in each service repair verbatim.

7. The method of claim 6, wherein the step of reconstructing each service repair verbatim includes tokenization, wherein non-essential wording, characters, and white spaces are removed from each service repair verbatim.

8. The method of claim 7, wherein removing the non-essential wording from each service repair verbatim includes removing at least some stop words from the service repair verbatim.

9. The method of claim 8, wherein any stops words that are determined as part of the symptom are maintained in a corresponding service repair verbatim.

10. The method of claim 6, wherein the step of reconstructing each service repair verbatim includes stemming the symptom words and the repair action words for each service repair verbatim, wherein stemming includes reducing the symptom words and the repair action words to their base form.

11. The method of claim 6, wherein the step of reconstructing each service repair verbatim includes lexical matching each service repair verbatim with the diagnostic and prognostic ontology database.

12. The method of claim 11, wherein the lexical matching includes applying heuristic rules for identifying a diagnostic trouble code written as a string of characters in a particular service repair verbatim.

13. The method of claim 6, wherein the step of extracting combinations of information from the reconstructed service repair verbatims includes extracting combination of at least two terms from the identified part words, the symptom words, and the repair action words of each service verbatim.

14. The method of claim 13, wherein the extracted combinations of information are extracted as paired combinations.

15. The method of claim 13, wherein the extracted combinations of information are extracted as triplicate combinations.

16. The method of claim 5, wherein the step of clustering the service repair verbatims includes forming at least one part-based cluster, wherein a respective part-based cluster is constructed with service repair verbatims having a respective part name within each service repair verbatim, wherein indices of the service repair verbatims that include the respective part name are grouped to form the respective part-based cluster.

17. The method of claim 5, wherein the step of clustering the service repair verbatims includes forming at least one part-symptom cluster, wherein a respective part-symptom is constructed with service repair verbatims having a respective part name and associated symptom within each service repair verbatim, wherein indices of the service repair verbatims that include the respective part name and associated symptom are grouped to form the respective part-symptom cluster.

18. The method of claim 5, wherein clustering the service repair verbatims includes forming at least one part-symptom-action cluster, wherein a respective part-symptom-action cluster is constructed with service repair verbatims having a respective part name, an associated symptom, and an associated repair action within each service repair verbatim, wherein indices of the service repair verbatims that include the respective part name, the associated symptom, and the associated repair action are grouped to form the respective part-symptom-action cluster.

19. The method of claim 4, further comprising the step of generating a graphical report for analysis, the graphical report binning service repair verbatims of a cluster into user specified categories.

20. A method of extracting data from service repair verbatims in a vehicle service reporting system, the method comprising:

collecting the service repair verbatims from the vehicle service reporting system, each service repair verbatim including an identified problem with at least one vehicle part, a technician's comments concerning the at least one vehicle part, a symptom associated with the at least one vehicle part, and a repair action associated with the symptom;

providing a diagnostic and prognostic ontology database that is structured by a vehicle part classification, a vehicle part sub-class classification, and a relationship classification, wherein the relationship classification includes symptom relationships and action relationships;

reconstructing each of the service repair verbatims utilizing the diagnostic and prognostic ontology database and segregating each respective service repair verbatim into one or more sentences;

extracting combinations of information from the reconstructed service repair verbatims as a function of user input criteria by a processor;

determining a frequency of appearance of each combination extracted in the reconstructed service repair verbatims by the processor, and;

clustering the service repair verbatims for each combination based on the frequency of appearance by the processor, wherein the clustering the service repair verbatims includes forming at least one part-symptom cluster, wherein a respective part-symptom cluster is constructed with service repair verbatims having a respective part name and associated symptom within each service repair verbatim, wherein indices of the service repair verbatims that include the respective part name and associated symptom are grouped to form the respective part-symptom cluster wherein associating a symptom with a part name in a service repair verbatim comprises the following steps:

determining sentence boundaries within the service repair verbatim, the sentence boundaries identifying where the service repair verbatim is segregated into one or more sentences;

identifying the part name within one of the sentence boundaries of the service repair verbatim;

setting the part name as a focal term within each sentence boundary;

setting a window to include a respective number of terms to the left of the focal term and a respective number of terms to the right of the focal term;

determining whether the respective symptom appears within the window; and constructing a part-symptom relationship in response to the respective symptom appearing within the window.

21. The method of claim 20, wherein the step of constructing the part-symptom relationship further comprises the following steps of:

determining if multiple symptoms appear in the window;

determining a distance from each symptom identified in the window to the focal term;

selecting one of the multiple symptoms at a closest distance to the focal term; and constructing the part-symptom relationship utilizing the symptom closest to the focal term.

22. The method of claim 21, wherein each combination of the respective part name and the associated symptom forms a respective part-symptom cluster.

* * * * *